(No Model.)

J. T. ROBB.
INSULATING JOINT.

No. 382,272. Patented May 1, 1888.

ATTEST:

INVENTOR:

UNITED STATES PATENT OFFICE.

JAMES T. ROBB, OF NEW YORK, N. Y., ASSIGNOR TO BERGMANN & COMPANY, OF SAME PLACE.

INSULATING-JOINT.

SPECIFICATION forming part of Letters Patent No. 382,272, dated May 1, 1888

Application filed March 5, 1887. Serial No. 229,818. (No model.)

*To all whom it may concern:*

Be it known that I, JAMES T. ROBB, of New York, in the county and State of New York, have invented a certain new and useful Improvement in Insulating-Joints for Electric-Light Fixtures, of which the following is a specification.

My invention relates to joints for hanging electric-light fixtures, or combined gas and electric-light fixtures, from the gas-piping of a house and serving to insulate the fixture from the pipe from which it is suspended; and my object is to produce a device for this purpose which shall be simple and cheap of construction, easily put in place, durable in use, and effective as a mechanical support and as an insulating-body; and my invention consists in the novel devices and combinations of devices employed by me in accomplishing the above-named objects, as hereinafter set forth and claimed.

Figure 1:
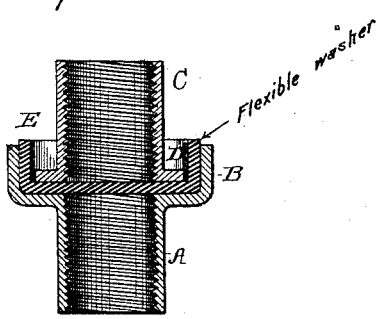
Figure 2:
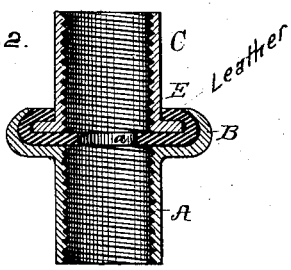

In the accompanying drawings, Figure 1 is a vertical section of an insulating-joint embodying my invention before its entire completion; Fig. 2, a similar view of the same joint complete; and Fig. 3, a similar view of a modified form of joint.

A is a screw-threaded tube or sleeve having at one end an enlarged cup or cup-shaped flange, B, in one piece with the sleeve A.

C is another screw-threaded sleeve provided with a flange, D.

I place between the flanges of the two screw-threaded sleeves a washer, E, of flexible insulating material. I prefer to use leather, which may be first soaked in oil, paraffine, or similar substance, to increase its flexibility and improve its insulating property. The washer E is placed, as shown in Fig. 1, with its edges bent up above the flange D and within the sides of the cup B, after which, by means of a drop-press or in any other suitable manner, I bend down the edges of the cup B and so also force the edges of the washer E against the tube C, so as to force all the parts tightly and closely together, making a solid and compact structure, as shown in Fig. 2. If the joint is intended to permit the passage of gas, as in a combination-fixture, I then bore through the center of the washer E, forming an aperture, *a*, Fig. 2.

In the use of the joint one of the screw-threaded sleeves is screwed upon the gas-pipe projecting from the wall or ceiling of the house, and the fixture is attached to the other sleeve, as will be readily understood.

The special advantages of this form of joint, in addition to its strength, compactness, and simplicity, are the reliability of the insulation, there being no danger of breaking through or crushing the insulation by the forcing of the metal parts too violently upon it, which danger occurs with those insulating-joints in which the parts are screwed together upon the insulation; also the leather is very durable for this purpose, and does not deteriorate in use, and is not affected by the gas or by the heat to which it may be exposed, as rubber and other materials which have been heretofore used for this purpose are. The joint also is perfectly gas-tight.

Figure 3:
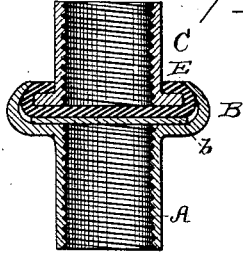

The modification shown in Fig. 3 is especially intended for simple electric-light fixtures where it is desired to close the gas-outlet, its object being to close the gas-pipe more certainly than by the insulating-washer alone. In this form a small washer or disk, *b*, of brass or other suitable metal, is placed under the insulating-washer, and, being held tightly, between said washer and the cup B, effectively prevents the escape of the gas. I may, however, for convenience of manufacture, to avoid the necessity of making two kinds of joints, make all my joints with the metal washer *b*, and when the gasway is wanted bore through both the metal and insulating-washers.

What I claim is—

1. In an insulating-joint, the combination of two flanged tubes and a flexible insulating-washer between them, one of the flanges and the flexible washer being turned at their edges over the other flange, whereby the two tubes are secured together and insulated from each other, substantially as set forth.

2. In an insulating-joint, the combination of two flanged tubes and a flexible insulating-washer between them having a central aperture, one of said flanges and the flexible washer being turned at their edges over the other flange, substantially as set forth.

3. In an insulating-joint, the combination of two flanged tubes, a metal washer and a flexible insulating-washer between them, one of the flanges being turned at its edges over the washers, and the other flange to hold the parts together.

This specification signed and witnessed this 3d day of March, 1887.

JAMES T. ROBB.

Witnesses:
P. H. KLEIN, Jr.,
JNO. F. GEIDEL.